United States Patent Office 2,857,374
Patented Oct. 21, 1958

2,857,374
MIXED POLY-(CYCLIC ACETALS) AND PROCESS

Ronald J. Baird, Philadelphia, Pa., assignor to The National Sugar Refining Company, New York, N. Y., a corporation of New Jersey No Drawing. Application March 24, 1954
Serial No. 418,479

19 Claims. (Cl. 260—209)

This invention is that of certain mixed poly-(cyclic acetals) of sugars, comprising a heterogeneous type of poly-(cyclic acetal), one cyclic acetal residue of which must be the propylidene group. The invention includes also the method of preparation of these mixed poly-(cyclic acetals). The products of the invention are substantially water-insoluble and have various useful properties described below.

Attempts to make certain water-insoluble cyclic acetals of sugar have been quite disappointing due to either cumbersome methods or the limited yields and difficulties encountered in the procedures. For example, attempts to condense sucrose with economically practical quantities of acetone and catalyst result in poor yields of the cyclic acetal with most of the sucrose gumming and balling up so that no further condensation can occur. No economic recovery of this large proportion of unreacted sucrose for re-use is possible. Similar disadvantages occur in attempts to prepare higher aldehyde condensation derivatives of sugar, for example, its hexaldehyde and heptaldehyde derivatives.

These various difficulties are overcome by the method of this invention whereby the presence of at least about ten mole-percent of propionaldehyde along with the other aldehyde or ketone enables the cyclic acetalization of the sugar to proceed smoothly and to substantial completion in a relatively short time.

Considered generally, the method of the invention involves the preparation of these mixed poly-(cyclic acetals) of sugars by condensing a sugar simultaneously with propionaldehyde and at least one other carbonyl group-containing, non-sugar aliphatic compound (of the type more fully described below), and in the presence of a catalytically effective amount of an acid acetalization catalyst. In the method of the invention the propionaldehyde must be present to the extent of at least about ten, and is used up to about ninety, mole-percent (of the total number of moles of it and any other carbonyl group-containing, non-sugar aliphatic compound used).

The at least one other carbonyl group-containing, non-sugar aliphatic compound is a member of the class consisting of (a) an aldehyde having more than three carbon atoms, i. e. an aldehyde higher than propionaldehyde, (b) a ketone, (c) a halogen-substituted aldehyde having at least two carbon atoms, and (d) a halogen-substituted ketone.

By "mole-percent" is meant the percentage that the number of moles of the particular reagent used, in this case the propionaldehyde, is of the total number of moles of the particular reagents referred to; or as in this case, the sum of the moles of propionaldehyde and moles of the other non-sugar, carbonyl group-containing aliphatic compound.

By "poly-(cyclic acetal) of a sugar" is intended a sugar having on the same saccharide molecule at least two cyclic acetal rings. The individual cyclic acetal rings result in the method of the invention from the elimination of water in the reaction of the sugar with the propionaldehyde and other aldehyde or ketone. This may be considered graphically as if by the condensation of the oxygen of their carbonyl group with the hydrogen of each of two near hydroxyl groups of the sugar. These hydroxyl groups should be linked respectively to adjacent carbon atoms of the chain of carbon atoms of the sugar, or to carbon atoms separated from one another by an intervening carbon atom. Thereby, there are produced respectively five- or six-membered cyclic acetal rings on the saccharide molecule.

Thus, the condensation of propionaldehyde with two hydroxyl groups of a sugar introduces the propylidene group,

into the saccharide molecule to form the cyclic acetal ring

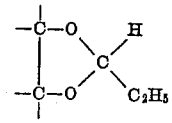

Similarly, the condensation with butyraldehyde introduces the butylidene group,

to form the cyclic acetal ring

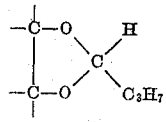

Thus, the expression "divalent cyclic acetal residue" used in the description of the products of this invention means the divalent group introduced by such condensation into the saccharide molecule and linked to the two of its oxygens from each of which its respective hydrogen has been removed by the elimination of water in the condensation. In other words, it is the divalent residue of the aldehyde or ketone after removal from it of the oxygen atom from its carbonyl group.

More particularly the products of the invention are the mixed poly-(cyclic acetals) of a sugar, obtained by the method of the invention. They are the products resulting from the condensation of the sugar with the propionaldehyde (used to at least ten mole-percent) and the other aldehyde or ketone, in the presence of the acid catalyst, and remaining after removal of the catalyst and any water introduced with it as well as the water formed during the condensation.

The mixed poly-(cyclic acetals) of a sugar, embraced by the invention, comprise a heterogeneous type of poly-(cyclic acetal) of the sugar. This heterogeneous type (a) has the propylidene group as one of its divalent cyclic acetal residues, and (b) the same saccharide molecule having the propylidene group has at least one other divalent cyclic acetal residue resulting from the condensation that took place, through the removal of water, between hydroxyls of the saccharide and the carbonyl group of the other carbonyl group-containing non-sugar aldehyde or ketone used in the preparation of the mixed poly-(cyclic acetals).

The method of the invention is exceptionally effective with sucrose as the sugar; and the resulting mixed poly-(cyclic acetals) of sucrose, comprising a heterogeneous type of poly-(cyclic acetals) of sucrose and having the propylidene group in one of its cyclic-acetal rings, are advantageously useful. The method is applicable also to other disaccharides such as lactose and maltose, to trisaccharides as raffinose, and monosaccharides such as fructose, glucose, and invert sugar, and in addition to the various hexoses, to pentoses also, for example, xylose, and to oligo-saccharides.

Among the non-sugar, carbonyl group-containing aliphatic compounds, other than propionaldehyde, that can be condensed along with it with any of the applicable sugars are aldehydes and ketones, saturated or unsaturated, and straight or branched chain, or cyclic, and any of them unsubstituted or substituted with radicals or groups that are inert under the reaction conditions. Suitable aliphatic aldehydes are saturated and open-chain, and include n-butyraldehyde, iso-butyraldehyde, valeraldehyde, trimethylacetaldehyde (or pivaldehyde), the methyl pentanals as 2-methyl pentanal-1, capronaldehyde, the dimethyl butyraldehydes, trimethyl propionaldehyde, a heptaldehyde, 2-ethyl hexaldehyde, an octaldehyde, a nonaldehyde such as 2,5,5-trimethylhexaldehyde, and unsaturated aldehydes as crotonaldehyde, hexadienal, vinyl crotonaldehyde; and cyclic as cyclopentyl aldehyde; and the substituted lower and higher aldehydes, as halo-substituted such as chloral or bromal, or dichloropropionaldehyde; as well as reversible polymers of the aldehydes that form them, for example, trimers such as para-propionaldehyde and para-butyraldehyde.

Among the ketones are the aliphatic which comprise acetone, methyl ethyl ketone, the propyl and iso-propyl methyl ketones, the four butyl methyl ketones (e. g. methyl iso-butyl ketone), the methyl amyl ketones, the methyl hexyl ketones, and other open-chain ketones which also can be substituted such as the halo-ketones as chloracetone, and also the cyclic ketones as cyclopentanone, methyl cyclopentanone, dimethyl cyclobutanone, ethyl cyclobutanone, cyclohexanone, the alkylcyclohexanones as the technical mixture of ortho-, meta-, and para-methylcyclohexanone, and others.

The ratio of the propionaldehyde together with the other aldehyde or ketone used, to the sugar should be sufficient to yield mixed poly-(cyclic acetals) with the quantity of sugar used. This can readily be checked by preliminary laboratory tests. If too much sugar was used, that can be noted from the extent of residual sugar left after the propionaldehyde and other aldehyde or ketone has been consumed in the condensation.

It is advantageous for the total of the propionaldehyde and other aldehyde or ketone used to be a slight excess over that required to form cyclic acetal groups with all of the hydroxyl groups available for such condensation in the amount of the particular sugar used. That can be determined by easy control test involving check for any excess of the aldehyde or ketone used after all the sugar has gone from the solid state in the reaction mixture and the latter is uniformly liquid.

The acid acetalization catalyst may be inorganic as a strong mineral acid such as sulfuric, hydrochloric, nitric, or phosphoric acid, or an acid-reacting salt such as a halide salt as calcium chloride, ferric chloride, aluminum chloride, zinc chloride, ammonium chloride, or boron trifluoride, or boron trifluoride etherate, or a sulfate salt as anhydrous copper sulfate, or sodium or other alkali metal acid sulfate, or sodium or other alkali metal acid phosphate. Some halogenated aldehyde, for example, chloral or bromal, may by itself present sufficient acidity to require no separate addition of acid catalyst. The catalyst also may be an organic aromatic acid, such as a mononuclear aromatic sulfonic acid as phenolsulfonic acid, benzene sulfonic acid, or para-toluene sulfonic acid, or polynuclear, for example, a dinuclear aromatic sulfonic acid as a naphthalene sulfonic acid such as a naphthalene disulfonic acid.

The quantity of acid catalyst will vary with the reactants used, or reaction conditions such as the temperature. It should always be less than that which would decompose the sugar, as by charring or dehydration, under the reaction conditions. That can be determined by simple observation for undue discoloration. However, it need only be sufficient effectively to catalyse the cyclic acetalization under the reaction conditions. It can then be as little or less than about one or two tenths of a percent of the total weight of reactants used, or about one-quarter to one-half percent of them, although a percent or two of such total weight could be used. The amount of catalyst thus is merely a small percentage, in the range indicated, of the total weight of reactants used.

The condensation can be carried out in a vessel adapted for external liquid or steam heating, such as a steam jacketed kettle, and equipped with a strong stirrer and either reflux condenser or for operation under pressure. The particular sugar and the propionaldehyde and other aldehyde and ketone used are best added first while operating the stirrer and then the acid cyclic acetalization catalyst is added. Ordinarily the reaction batch containing a non-sugar aldehyde reactant need not be initially heated, as the reaction is self initiating because of heat of trimerization of the aldehyde. After the reaction has been going on for about an hour or so, the temperature of the heating bath can be raised gradually over one to a few hours or so to between 70 and 80° C., or between about 70 and slightly over 90° C.; or steam at atmospheric pressure can be fed into the steam jacket of the jacketed kettle to raise the temperature of the reaction gradually to preferably under 100° C. In the pressure vessel the pressure might at the same time increase to about twenty pounds per square inch.

These temperature conditions will vary as to the particular sugar used and should be below that at which the sugar can decompose, as by charring or dehydration. The reaction is best continued until all of the sugar changes from the solid form to show a relatively uniformly liquid reaction batch. When operating in an autoclave or other pressure vessel, the end of the reaction usually is indicated when the pressure drop is ended. The acid is then removed, either by neutralization with sufficient alkali, beneficially alkali metal or alkaline earth metal carbonate, or by passage through a bed of anion exchange resin. Neutralization can also be done by ammonia.

The process of the invention and the mixed poly-(cyclic acetals) of a sugar, comprising the heterocyclic type of such acetal, wherein one cyclic acetal ring has the propylidene group linked to its two oxygens and on the same saccharide molecule is the divalent residue of a different aliphatic, non-sugar aldehyde or ketone of the type described above, are illustrated by, but not restricted to the following examples:

*Example 1.—Sucrose, propionaldehyde and butyraldehyde.*—400 gms. (1.17 moles) of fine granulated sugar, 30 grams (0.517 mole) of propionaldehyde, 336 grams (4.667 moles) of butyraldehyde, and 4 grams of phenol sulphonic acid were allowed to react while being agitated in a flask provided with stirrer and reflux condenser, and heated by a water bath held as 70 to 80° C. until practically all the sugar dissolved (5½ hours). The solution then was allowed to cool, and was diluted with acetone to facilitate its flow. The small amount of gummy material thrown out of solution on adding the acetone was separated by decantation. The clear decanted solution was then passed through a bed of an anion exchange resin to remove the acid that was used as catalyst. The neutral effluent then was concentrated, and yielded 600 grams of viscous product which partly crystallized on standing.

*Example 2.—Sucrose, propionaldehyde and butyraldehyde.*—Into a steam-jacketed copper autoclave equipped with an agitator adapted to stir a heavy slurry there was charged 10.2 liters (8.33 kilos) of butyraldehyde. With the agitator going there were added 3.75 liters (2.72 kilos) of propionaldehyde, and while stirring vigorously twenty pounds (9.08 kilos) of sugar were mixed in. Forty grams of phenolsulfonic acid were then added and the autoclave was closed. While the agitator was going continuously, the temperature was allowed to rise, to about 50° C., by the heat of the reaction itself without application of any external heat. After an hour, steam at atmospheric pressure was introduced into the steam-jacket. The reaction was raised in that way to about 97° C. while the pressure in the autoclave rose to a maximum of about twenty pounds per square inch.

In about four hours, after all of the solid sugar had reacted and thus no longer appeared in the reaction mixture, the reaction was complete. In that time, the pressure in the autoclave dropped to almost zero. The reaction mixture then was cooled to about 50–60° C. and neutralized by stirring in forty grams of powdered sodium carbonate monohydrate. The neutral mixture was filtered and then concentrated in two stages; first, at atmospheric pressure to recover unreacted excess aldehyde, and then at reduced pressure, in this case twenty-three inches of mercury, to remove the remaining butyraldehyde and water formed during the acetalization.

There remained as the yield twenty-seven pounds of a clear, light yellow, resinous product, soft enough to flow readily while hot. The end product comprising the heterogeneous propylidene butylidene polycyclic acetal of the sugar is practically insoluble in water and in aliphatic hydrocarbons, for example, normal-heptane, mineral oil, and gasoline, and in chlorinated hydrocarbons such as carbon tetrachloride. The product is readily soluble in a large variety of other solvents, for example, lower alkyl alcohols such as lower alkanols as methanol, ethanol, normal-butanol, with the solubility indicating a decrease as the molecular weight of the alkanol increased, and lower alkyl polyhydric alcohols as ethylene glycol, also alkyl ketones such as acetone, methylethyl ketone, methylbutyl ketone, methylisobutyl ketone, and in lower alkyl esters as ethyl acetate; also in amines such as lower alkylamines as monoisopropylamine, and mononuclear heterocyclic amines as pyridine, and also in mononuclear aromatic hydrocarbons as benzene and toluene.

*Example 3.—Sucrose, propionaldehyde and butyraldehyde.*—Into the autoclave of Example 2 and following the procedure in it, there was charged 16.5 liters of butyraldehyde, 2 liters of propionaldehyde, thirty-five pounds of sugar, and one hundred grams of phenolsulfonic acid. Then after the reaction continued for an hour to about 50° C. without external heat, low pressure steam was fed into the steam jacket for about three hours, by which time all of the solid sugar disappeared into the liquid reaction batch, while the pressure in the autoclave rose to eighteen pounds per square inch, and then dropped back to zero to show that the reaction was completed. The reaction batch was then still handled as in Example 2 and neutralized with one hundred grams of the same sodium carbonate. After removal of excess aldehyde by concentration, there remained a partly crystalline, opaque, light yellow syrup with a mild pleasant odor and sharp bitter taste. It contained 90% solids, was substantially insoluble in water with only a slight solubility in normal-heptane and in carbon tetrachloride, and was completely soluble in methanol, ethanol and butanol.

*Example 4.—Sucrose, propionaldehyde and heptaldehyde.*—400 grams of fine granulated sugar, 200 grams (3.45 moles) of propionaldehyde, 200 grams (1.75 moles) of heptaldehyde, and 4 grams of toluene sulphonic acid were allowed to react while being agitated in a vessel provided with stirrer and reflux condenser. After one hour all of the sugar was in solution and temperature of the mixture reached 87° C. 4 grams of calcium carbonate made into a slurry with a small amount of water were stirred in to raise the pH to about 6, and the mixture was filtered, and the filtrate decolorized with decolorizing carbon, and its filtrate concentrated. The yield was 680 grams of product insoluble in water, soluble in ethanol, and even more readily soluble in methanol.

*Example 5.—Sucrose, propionaldehyde and crotonaldehyde.*—400 grams of sugar, 300 milliliters (242.0 grams or 4.17 moles) of propionaldehyde, 300 milliliters of crotonaldehyde, and 4 grams of toluene sulphonic acid were processed as in Examples 1 and 4. The yield was 530 grams of product. In the appended claims the divalent cyclic acetal residue referred to as the crotonylidene group is also called the 2-butenylidene group.

*Example 6.—Sucrose, acetone and propionaldehyde.*—400 grams of sucrose, 200 milliliters of acetone, 200 milliliters (2.78 moles) of propionaldehyde, and 4 milliliters of commercial 65% phenol sulphonic acid were stirred under reflux condenser, and heated by means of a water-bath held at 80 to 90° C. The sugar gradually went into solution. After 3 hours, six grams of powdered sodium bicarbonate were added, and the stirring continued for five minutes. The heating bath was then removed, and 400 milliliters of 91% isopropyl alcohol were added, and the solution filtered. The filtrate solution was then treated with 10 grams of decolorizing carbon, filtered and concentrated by evaporation under reduced pressure of about 23 inches of mercury, and yielded 415 grams of clear, soft resinous product.

*Example 7.—Sugar, chloral and propionaldehyde.*—200 grams of sugar, 190 grams (1.29 moles of chloral technical grade and 85 milliliters (1.06 moles) of propionaldehyde were stirred and heated together (without a catalyst) for three hours and five minutes, in a flask immersed in a bath having a starting temperature c.—70° C. The bath was gradually heated to 92° C. over this time, thereby to avoid darkening the batch. The sugar gradually went into solution. Toward the end of the reaction, the remaining sugar dissolved rapidly and the heating of the solution was carefully controlled to avoid undue discoloration. When all of the sugar had entered into the reaction as seen by the reaction mixture's becoming a practically homogeneous solution, 5 grams of powdered sodium bicarbonate were stirred in while the batch was still hot, to neutralize the acidity produced. The product was diluted with 200 milliliters of methanol to permit filtration; the filtrate was decolorized with decolorizing carbon, filtered, and the resulting filtrate concentrated by evaporation. The product was a clear, brittle, water-insoluble resin; yield 260 grams. No deliberate separate addition of an acid catalyst was needed because this particular grade of chloral contained free hydrochloric acid.

*Example 8.—Sugar, chloral and propionaldehyde.*—In a flask provided with stirrer and reflux condenser, with the stirrer going continuously there were added in the order named, 295 grams of chloral, 250 milliliters of dioxane, 342 grams (1 mol) of sucrose, 127.5 grams of propionaldehyde, and one milliliter of phenol sulfonic acid (the commercial 65% acid). The reaction mixture was heated by means of a water-bath held at 60 to 65° C. After an hour all the sugar had reacted (as seen by its no longer being present in solid form). Ten grams of powdered sodium bicarbonate then were added, and the stirring was continued at the same temperature until the reaction liquid tested between pH 6 and 7 on pH test paper. It then was filtered. The filtrate was concentrated under reduced pressure on the steam-bath until all the dioxane (used as solvent) was removed. The reaction product remaining was fluid while hot and was poured off. On cooling, the end product (yield 552 grams) was a brittle solid with some tackiness. It was slightly soluble in water and toluene, and completely soluble in acetone, methanol, and ethanol; in ethylene, propylene and hexylene glycols; and in ethylene glycol monomethyl ether and ethylene glycol monobutyl ether.

*Example 9.—Sugar, chloroacetone and propionaldehyde.*—200 grams of sugar, 150 milliliters of chloroacetone, 150 milliliters of propionaldehyde, 1 milliliter of boron trifluoride etherate (same as used in Example 10)

were processed as in Example 10. The reaction in this case required about 2 hours.

*Example 10.—Sugar, cyclohexanone and propionaldehyde.*—200 grams of sugar, 150 milliliters (121.0 grams or 2.09 moles) of propionaldehyde, 1 milliliter of boron trifluoride etherate containing 7.6 to 7.8% boron, were reacted for 4 hours with stirring and refluxing over a bath held at 80° C. The reaction mixture was cooled, diluted with 150 milliliters of acetone (throwing 41 grams of material out of solution), filtered, neutralized over anion exchange resin, and concentrated. The yield of clear resinous product was 316 grams, insoluble in water and in mineral oils; slightly soluble in normal-heptane and carbon tetrachloride, and soluble in methanol, ethanol, butanol, and acetone.

*Example 11.—Sugar, 2-ethylhexaldehyde, propionaldehyde.*—200 grams of granulated sugar, 185 milliliters of 2-ethylhexaldehyde, 150 milliliters of propionaldehyde, and 1 gram of phenolsulfonic acid (added last) were allowed to react together for five hours with stirring, over a bath held at 70–74° C. The reaction solution then was cooled, diluted with 150 milliliters of benzene, neutralized with two grams of sodium carbonate at 45–50° C., and filtered. The filtrate was concentrated, driving off excess aldehyde and the diluent, and thus left behind the substantially water-insoluble resinous end product.

*Example 12.—Glucose, butyraldehyde and propionaldehyde.*—In a three-necked, round bottom flask equipped with stirrer and reflux condenser, there were mixed twenty-nine grams (0.5 mole) of propionaldehyde, 36 grams (0.5 mole) of butyraldehyde, 90 grams (0.5 mole) of anhydrous dextrose, and 1 milliliter of commercial phenol sulfonic acid (added last). The mixture was stirred without external heating for an hour, and then heated in a water-bath held at 60–65° C. for three and one-half hours. The solution was then neutralized by stirring with 2 grams of calcium carbonate, while being heated in a water-bath held at 65–70° C. The mixture was then cooled and filtered, and the filtrate concentrated, leaving the resinous solid product of the reaction.

*Example 13.—Galactose, acetone and propionaldehyde.*—A mixture of fifty-four grams of anhydrous galactose (0.3 mole), 20.1 grams of 95% propionaldehyde (0.33 mole), sixty-five milliliters of acetone (excess) and 3 milliliters of commercial 65% phenolsulfonic acid (added last) was stirred under reflux condenser for four and one-half hours while being heated in a water-bath held at 75 to 80° C. Practically all the sugar had reacted after this time. The mixture was allowed to cool, and was dissolved in one hundred milliliters of methanol, and then neutralized by stirring at about 50° C. with three grams of powdered sodium bicarbonate. The mixture then was cooled, filtered with the aid of Celite, and the resulting filtrate was concentrated on the steam-bath under twenty-three inches of vacuum. The product, weighing 59.5 grams, was a clear, brown, fusible resin, very soluble in methanol, but only slightly soluble in water.

As already pointed out, the propionaldehyde is an essential reagent in the process of the invention and to provide the propylidene group as a required one of the heterogeneous cyclic acetal residues in each of the mixed poly-(cyclic acetals) products of the invention.

In the various examples, the commercial propionaldehyde was used. The specific other aldehyde or ketone used with the propionaldehyde in the various individual examples can be replaced respectively by about the same molal proportion of some other aldehyde or ketone of its same type or any other type of those described above as applicable in the invention, or by mixtures of any of them.

In the process, the catalyst can be added as in the several examples or dissolved or otherwise dispersed in an inert solvent or vehicle for it. Thus, where acetone is one of the reactants, for example, the quantity of phenolsulfonic acid to be used as catalyst is dissolved in some of the acetone and thus added in solution. In other cases, for example, the phenolsulfonic acid can be dissolved in a convenient quantity of an inert solvent such as an ether as dioxane, and its such solution then added.

During the progress of the process, some amount of the aldehyde cleaves some of the sucrose in the examples using it as the sugar. Accordingly, the end products of such examples contain, along with the mixed poly-(cyclic acetals) of sucrose, comprising the heterogeneous type of such acetal, amounts of such like acetals of fructose and glucose.

Then, as sucrose can hydrolyze when heated in the presence of water and acid and thereby go through inversion to fructose and glucose, and as water forms by the condensation of the process of the invention, some inversion also can occur. As a result, the end products of these examples will contain also comparatively minor amounts of such like acetals of fructose and glucose, due to inversion of some of the sucrose.

With some little variation from product to product, for the most part the products of the invention generally exhibit the solubility properties described above for the product of Example 2.

The products of the invention are compatible with natural resins such as zein, and with synthetic resins as cellulose esters such as its nitrate, acetate, or acetate-butyrate, and cellulose ethers, for example, methyl or ethyl cellulose, and with polyvinylacetate. On incorporation into such resins, these new products impart to them desirable properties, for example, improved plasticity.

The mixed poly-(cyclic acetals) of the heterogeneous type, products of the invention, contribute increased tensile strength to, when incorporated in, textile fibres such as cotton threads. Such threads, after having products of the invention incorporated in them from suitable dispersions, have shown, after drying, improved abrasion resistance. They serve also to flatten the frizzes, i. e. the wild ends. Some of the products are beneficial in textile size formulations and also in paper size compositions.

Others of the products are useful as road dust allaying compounds, and as additives to tar or asphalt to enhance adhesion to the gravel or stone. The products are useful as molding sand adhesives, as addition agents to belt dressings to reduce or even eliminate slippage, and for the same advantage on ball mill trunnions, and are beneficial for use in a backing for improving the immobility of scoring or abrasive paper disks or sheets on their rotatable supports.

The products can be useful in sprays, for example, dispersed with an insecticide, or fungicide or other parasiticide, as sulfur or other such, alone or together, in water to make it adhere to foliage or other surfaces to be protected. For these and other uses, where the products are to be dispersed in a liquid vehicle such as water, the selected product of the invention, such as that of examples 1, 2 and 3, is thus dispersed by using, for example, between about five and about thirty percent of a compatible dispersing agent, e. g. a surfactant, by weight of the total weight of it and the mixed poly-(cyclic acetals) used. The surfactant may be of any of the common types as seen from illustrations of mixtures of them with, for example, the product of examples 1, 2 or 3 (briefly designated propylidene butylidene sucrose or the mixed acetal):

(*a*) Non-ionic: ten parts of polyoxyethylene sorbitan mono-laurate (from Atlas Powder Company, of Wilmington, Delaware, under their trade-mark "Tween 20") with ninety parts of the mixed acetal gave only a fair dispersion of the latter in water, while twenty parts of "Tween 20" to eighty of the mixed acetal gave an excellent dispersion. Then, ten parts of the Atlas' "Tween 40" (polyoxyethylene sorbitan monopalmitate) gave an excellent dispersion with ninety parts of the mixed acetal, in water, which showed very good adhesion qualities.

(b) Anionic: alkyl aryl sulfonates, as twenty parts of the triethanolamine salt of an aryl alkyl sulfonate (from Atlantic Refining Company, Philadelphia, Pennsylvania) gave an excellent dispersion with eighty parts of the mixed acetal, in water. The dispersion showed good adhesive qualities. Then, the sodium salt of sulfonated butyl ester of oleic acid ("Dynesol EP" of Amalgamated Chemical Company, Philadelphia, Pa.) gave excellent dispersions, showing very good adhesion qualities, even in proportions as low as ten parts of it to ninety of the mixed acetals.

(c) Cationic: aryl quaternary ammonium chlorides, as methyl-dodecyl-benzyl trimethyl ammonium chloride (from Rohm & Haas, of Philadelphia, Pa., under their trade-mark "Hyamine 2389" 50%) at twenty parts to eighty parts of the mixed acetal gave excellent dispersions with excellent adhesion qualities. The same good characteristics were shown by the dispersions with ten parts of di-isobutyl sodium sulfo-succinate (from American Cyanamid Company of New York, N. Y. under their trade-mark "Aerosol 1B") to ninety parts of the mixed acetal.

At least some of the products are effective as adjuncts in pressure adhesive formulations. In conjunction with polyvinyl acetate they tend to give quicker tack. Due to their lower cost, particularly those comprising propylidene butylidene sucrose, come into consideration as an extender for polyvinyl acetate.

The various uses described are particularly manifested by the product comprising propylidene butylidene sucrose. This product and others can serve in wall paper and fly paper adhesives, in tile mastic, and as an adhesive for use in tree banding. This product has also shown beneficial effects when incorporated in soils.

This application is a continuation-in-part of my co-pending application Serial No. 46,375, filed August 26, 1948, now abandoned.

While the invention has been more specifically described in relation to certain specific embodiments of it, it is understood that various modifications and substitutions can be made in them within the scope of the appended claims, which are intended also to cover equivalents of the various disclosed embodiments.

What is claimed is:

1. A process of producing a substantially water-insoluble composition comprising poly-(cyclic acetals) of a sugar, containing a heterogeneous type of poly-(cyclic acetal), from a sugar and at least one carbonyl group-containing aliphatic compound, other than a sugar, and which is a member of the class consisting of (a) an aldehyde with more than three carbon atoms, (b) a ketone, (c) a halogen-substituted aldehyde, and (d) a halogen-substituted ketone; which process comprises including propionaldehyde in the reaction mixture of the sugar and the carbonyl compound and to the extent of from about ten to about ninety mole percent of the total of said carbonyl compound and the propionaldehyde, and condensing the sugar with the carbonyl compound in the presence of and with the propionaldehyde, and in the presence of a catalytically effective amount of an acid acetalization catalyst.

2. The process as claimed in claim 1, wherein the sugar is sucrose.

3. The process as claimed in claim 1, wherein the carbonyl group-containing compound is a butyraldehyde.

4. The process as claimed in claim 3, wherein the sugar is sucrose.

5. The process as claimed in claim 3, wherein the carbonyl group-containing compound is normal butyraldehyde.

6. The process as claimed in claim 1, wherein the carbonyl group-containing compound is acetone.

7. The process as claimed in claim 1, wherein the carbonyl group-containing compound is chloral.

8. The process as claimed in claim 1, wherein the carbonyl group-containing compound is cyclohexanone.

9. The process as claimed in claim 1, wherein the carbonyl group-containing compound is crotonaldehyde.

10. A process as claimed in claim 1, wherein the sugar and the propionaldehyde and the other carbonyl group-containing compound are condensed at an elevated temperature below that at which the sugar is carbonized.

11. A process as claimed in claim 10, wherein the reaction is continued at the elevated temperature until there is substantially no sugar in solid form in the reaction medium, and the reaction batch is then treated to remove the acid catalyst.

12. A process as claimed in claim 11, wherein the liquid reaction batch is passed through an anion exchange resin to remove the acid substance used as the catalyst.

13. Poly-(cyclic acetals) of a sugar, comprising a poly-(cyclic acetal) of the heterogeneous type wherein one of its divalent cyclic acetal residues is the propylidene group and which type has on the same saccharide molecule containing said propylidene group at least one other divalent cyclic acetal residue derived from a carbonyl group-containing non-sugar aliphatic compound of the class consisting of (a) an aldehyde with more than three carbon atoms, (b) a ketone, (c) a halogen-substituted aldehyde, and (d) a halogen-substituted ketone; said poly-(cyclic acetals) of a sugar being the same as the poly-(cyclic acetals) of a sugar derived by use of the method of claim 1; said poly-(cyclic acetals) being substantially insoluble in water, insoluble in normal-heptane and in carbon tetrachloride, and soluble in methanol and ethanol.

14. The poly-(cyclic acetals) of a sugar as claimed in claim 13, wherein the at least one other divalent cyclic acetal residue is a butylidene group.

15. The poly-(cyclic acetals) of a sugar as claimed in claim 13, wherein the at least one other divalent cyclic acetal residue is that derived from acetone.

16. The poly-(cyclic acetals) of a sugar as claimed in claim 13, wherein the at least one other divalent cyclic acetal residue is that derived from chloral.

17. The poly-(cyclic acetals) of a sugar as claimed in claim 13, wherein the at least one other divalent cyclic acetal residue is that derived from cyclohexanone.

18. The poly-(cyclic acetals) of a sugar as claimed in claim 13, wherein the at least one other divalent cyclic acetal residue is the crotonylidene group.

19. The poly-(cyclic acetals) of a sugar as claimed in claim 14, wherein the at least one other divalent cyclic acetal residue is the normal butylidene group.

References Cited in the file of this patent

UNITED STATES PATENTS

| | | |
|---|---|---|
| 2,269,166 | Salo | Jan. 6, 1942 |
| 2,387,662 | Holst | Oct. 23, 1945 |
| 2,461,478 | Kaszuba | Feb. 8, 1949 |

OTHER REFERENCES

Freudenberg: Ber. Deut. Chem. Gesell, v. 61, pp. 1743–50 (1928).

Sutra: Chem. Abst., v. 38 (1944), page 3257.

Chem. Abst., v. 41, page 6210 (1947).